US006415289B1

(12) United States Patent
Williams et al.

(10) Patent No.: US 6,415,289 B1
(45) Date of Patent: Jul. 2, 2002

(54) NETWORK INFORMATION CONTROL METHOD UTILIZING A COMMON COMMAND FORMAT AND A CENTRALIZED STORAGE MANAGEMENT SYSTEM

(75) Inventors: Mike E. Williams; Keith Holmes, both of Tulsa, OK (US)

(73) Assignee: Williams Communications, Inc., Tulsa, OK (US)

( * ) Notice: Subject to any disclaimer, the term of this patent is extended or adjusted under 35 U.S.C. 154(b) by 0 days.

(21) Appl. No.: 09/272,933

(22) Filed: Mar. 18, 1999

Related U.S. Application Data

(63) Continuation of application No. 09/044,739, filed on Mar. 19, 1998, now abandoned.
(60) Provisional application No. 60/080,575, filed on Apr. 3, 1998.

(51) Int. Cl.[7] .......................... G06F 17/30; G06F 15/16
(52) U.S. Cl. .......................... 707/10; 707/37; 709/203; 709/219
(58) Field of Search ................................. 707/103, 1–3, 707/10, 103 R–103 Z, 104.1, 200–204; 709/201–203, 217–219

(56) References Cited

U.S. PATENT DOCUMENTS

| | | | | |
|---|---|---|---|---|
| 5,848,234 A | * | 12/1998 | Chernick et al. | 709/203 |
| 5,867,665 A | * | 2/1999 | Butman et al. | 709/239 |
| 5,920,725 A | * | 7/1999 | Ma et al. | 395/712 |
| 5,920,856 A | * | 7/1999 | Syeda-Mahmood | 707/3 |
| 5,922,074 A | * | 7/1999 | Richard et al. | 713/200 |
| 5,926,816 A | * | 7/1999 | Bauer et al. | 707/8 |
| 5,944,769 A | * | 8/1999 | Musk et al. | 701/201 |
| 5,960,420 A | * | 9/1999 | Leymann et al. | 707/1 |
| 6,014,686 A | * | 1/2000 | Elnozahy et al. | 709/202 |
| 6,026,414 A | * | 2/2000 | Anglin | 707/204 |
| 6,026,430 A | * | 2/2000 | Butman et al. | 709/203 |
| 6,031,977 A | * | 2/2000 | Pettus | 395/200.6 |
| 6,073,140 A | * | 6/2000 | Morgan et al. | 707/203 |
| 6,092,096 A | * | 7/2000 | Lewis | 709/200 |
| 6,098,108 A | * | 8/2000 | Sridhar et al. | 709/239 |
| 6,185,598 B1 | * | 2/2001 | Farber et al. | 709/200 |
| 6,201,611 B1 | * | 3/2001 | Carter et al. | 358/1.15 |
| 6,219,675 B1 | * | 4/2001 | Pal et al. | 707/201 |
| 6,260,069 B1 | * | 7/2001 | Anglin | 709/229 |

* cited by examiner

Primary Examiner—Maria N. Von Buhr
(74) Attorney, Agent, or Firm—Fulbright & Jaworski LLP

(57) ABSTRACT

A method of controlling information stored on a computer network. The method of the present invention comprises a means for indexing and storing information about information stored on the network in a database. Clients connected to the network that wish to access information stored on the network, are first approved by the indexing means and the storage device on which the information is stored is directed to deliver the requested information to the client. In addition, devices connected to the network communicate by means of a common command format.

22 Claims, 7 Drawing Sheets

Microfiche Appendix Included
(7 Microfiche, 590 Pages)

NETWORK INFORMATION CONTROL METHOD UTILIZING A COMMON COMMAND FORMAT AND A CENTRALIZED STORAGE MANAGEMENT SYSTEM

This application is a continuing application which claims priority from (i) application Ser. No. 09/044,739, filed Mar. 19, 1998, now abandoned and (ii) provisional application Ser. No. 60/080,575, filed Apr. 3, 1998, both of which applications are incorporated herein by reference.

This application contains Microfiche Appendix A consisting of seven (7) slides and 590 frames.

FIELD OF THE INVENTION

The invention relates to a method of manipulating and controlling information within a large scale network of computing and storage devices through the use of a common command format and centralized storage management across the network.

BACKGROUND OF THE INVENTION

Application Program Interfaces for Information Processing Devices

Modern computers and information storage devices (referred to here as simply "information processing devices") are manufactured worldwide by a wide range of companies (e.g., IBM, Compaq, Apple, etc.). A wide variety of such devices is currently manufactured.

The broad range of computers stretches from small computers designed to perform specialized tasks (e.g., operate a microwave or an ATM machine) to large, high speed, parallel processing computers such as are utilized in weather forecasting and other computing intensive applications (e.g., finite element analysis and aerodynamic modeling) and includes many computing devices between (household or business PCs).

There is also a wide variety of information storage devices including hard disks commonly used in personal computers (that may store millions or billions of bytes), CD-ROM drives, and large redundant arrays of inexpensive disks (RAID) servers that may store several trillion bytes. Of course, it is to be understood that the information stored in a byte is limited only to that information that may be represented in a binary format, i.e., the stored information may be data, a picture, a sound, a computer program, multi-media, etc.

Commonly, such a device is controlled through a command set referred to as an "interface." Generally speaking, an interface is a high-level set of commands which an information processing device is capable of recognizing and to which it can react in some manner.

For example, as shown in FIG. 1A, a storage device may be instructed to delete a particular file stored on it by sending it a command such as "DELETE, file_name." In this example, "file_name" is the name of the file or other information to be deleted.

Of course, those of ordinary skill in the art will appreciate that the foregoing example is a hypothetical example intended for purposes of illustration only. Actual interface commands are normally transmitted in digital form and may contain or require other additional or different information in a different format.

An information processing device may be controlled by, or control, other such devices by receiving or transmitting interface commands. Thus, a storage device may be controlled through an interface command (such as the one shown above) issued by a computer.

In addition, as shown in FIG. 1B and described in more detail below, a computer may control another computer by issuing an interface command.

Typically, interface commands to which a particular information processing device responds are related to the underlying function of the particular device. For example, a storage device (a hard disk) may respond to commands such as: DELETE, COPY, STORE, RETRIEVE, MOVE, etc. On the other hand, a computer may respond to commands such as: DISPLAY, TRANSMIT, PRINT, etc. Again, those of ordinary skill in the art will appreciate that the foregoing examples are illustrative only and actual interface commands may be different or require additional information.

Interface commands to which an information processing device responds are typically selected by manufacturers or interface designers. The selection of a particular command may or may not be dictated by any particular constraints. Thus, rather than choosing the command "DELETE", shown in the above example, a manufacturer or interface designer may select "REMOVE" or "42" or any other name for the command.

Because there are a large number of companies and individuals involved in the manufacture of information processing devices world-wide, as well as a large number of such devices, there are many different interface command sets. The command set that controls a particular device may be unique to that device.

Although not necessarily a requirement, interface commands are typically issued by computer programs. Computer programs are also referred to as "software," "code," or "applications." A developer or other person will write a computer program that issues a series of interface commands when run on a separate computer.

For example, as shown in FIG. 2, suppose that a developer writes a computer program to print a file (e.g., a letter). When run, the computer program issues an interface command to a disk drive to retrieve the file and another to an attached printer to print it.

Information processing devices commonly accept interface commands through software/hardware referred to as an applications programming interface (API). Normally, an API is implemented through software that accepts interface commands in a specialized format and then directly or indirectly causes the device in question to perform the operations or further process the command.

For example, controller software for a disk drive, e.g., basic input/output system (BIOS) software, may implement an API by accepting an interface command such as "WRITE, file_name" and then passing the command directly to the disk drive hardware in a format suitable for actually operating the hardware. The controller software may also perform other tasks (e.g., locate free space on the disk, move the drive head to the proper location, copy the file_name information to local storage on the disk drive, and then finally write the information to the disk).

Thus, as shown in FIG. 3, a developer of an application can write instructions (e.g., "disk_drive(WRITE, file_name);") that will be interpreted by other, API-implementing software. This is sometimes referred to as "writing to the API," where the term "API" is used as a colloquialism for software that implements the API.

In order to facilitate incorporation into existing systems and future programs, API's are commonly written specifically for information processing devices comprising specific combinations of software and hardware that are unique to that device and may or may not be common to any other device.

Computer Networks

As shown in FIG. 4, it is well known that computers may be connected together in a network or networks so that the computers may communicate and/or share resources such as storage. Computers connected in a network may be located close together, (e.g., a local area network (LAN) in an office) or somewhat farther apart on a wide area network (WAN).

In addition, computers may be connected to the worldwide network of computers referred to as the Internet. One portion of the Internet is referred to as the World Wide Web and is a network of computers complying with a graphical interface standard similar to the widely known Windows or Macintosh interfaces. Java is a programming language/script (Java applet) developed by Sun Microsystems, Inc. and incorporated or supported by other manufacturers. Java is designed to be a platform independent programming language.

Also as shown in FIG. 4, when operating across a network, computers may share resources such as storage. Indeed, shared storage (implying access to shared data) is one of the primary motivations for networking computers.

Shared storage reduces costs associated with computing because a single copy of the desired information may be accessed by a large number of computers. That in turn reduces some of the costs and other difficulties associated with storing and updating multiple copies of a particular piece of information.

Information processing devices which handle requests for information or activity from other devices are referred to as "servers." Requesting devices (e.g., computers operated by end users) are referred to as "clients." Both the term "server" and "client" focus on the operations being performed. Thus, a single computer may act as a server for some operations and a client for others. One or more clients and one or more servers together comprise a "client/server" network.

As illustrated in FIGS. 5 and 6, advances in network architectures over the last several decades have reduced the need for computers in a network to be connected to each other, i.e., there does not need to be a direct connection between each pair of computers on a network. Rather, interface commands or information intended for a particular information processing device may be passed along by several intervening computers before arriving at their intended destination. Specialized computers designed to manage interface commands and direct them to the proper device are referred to as "routers" or "switches." FIG. 6.

Interface Problems Across a Network

As shown in FIG. 7, a large number of information processing devices connected to a network will often require a large number of interface command sets and APIs to control. Thus, a client or end user wishing to access a particular piece of information stored on a device located somewhere on a network may need to know the particular interface command set and API of that device, and potentially of all the intervening devices.

As shown in FIG. 8, in the past, network software (e.g., Novell, Banyan, Windows NT, UNIX, etc.) executing on a network server has been used to insulate clients (end users) at least somewhat from the profusion of interface command sets. Network software typically does so by limiting clients to a series of network-supported operations. The network software controls the entire network; it interacts with and issues interface commands to connected devices through APIs designed for that network (strictly speaking, through software that implements the APIs). For example, a client in such a network may issue a request to print, possibly in a network specific format. The network software then translates the request into a format suitable for passage to an API written specifically for the combination of the particular network software and the particular information processing device; the request is then serviced.

The need to develop an API for each network software/device combination (of which there are typically a large number) and the translation of interface commands among and through various APIs is a limiting factor in the further integration and efficient operation of large scale networks of computing and storage devices.

Storage Problems Across Networks

Referring to FIG. 9, a further difficulty heretofore encountered in large scale networks relates to the manipulation and storage of data across the network. In order to reduce the total amount of work required by the network software and transmission of data across the network (often referred to as network "load") and the attendant slow response times, prior art computer networks and software have not attempted to manage storage across the network in a centralized manner. This decentralized method of operating a network is often referred to as a "distributed" system and storage management is performed at the local level.

Thus, on such a network there is no centralized list of files or locations. Clients must either know the storage location of a particular piece of information or must request a list of stored information from each storage device (often referred to as "polling").

Furthermore, in such a system the same item of information may be unwittingly stored in multiple locations thereby wasting valuable storage space.

Because distributed storage management systems require clients to know information locations or poll the storage devices, movement of information from one storage device to another in such a network may require clients to poll all the storage devices to retrieve information simply because the storage address has changed. In large scale prior art networks currently in the field, the lack of centralized storage management is a continuing source of expense and end user dissatisfaction.

As illustrated in FIG. 10, a further difficulty experienced in distributed storage management systems relates to changes (additions, deletions, modifications, or simple movement) of the stored information. This is referred to as the general problem of consistency control, often referred to as "cache consistency control" in multi-tasking operating systems. In distributed storage management systems, information in use by clients may be modified by other clients thereby resulting in errors in the first client's operations. For example, one client may be in the process of retrieving a spreadsheet with totals while another client may update the same spreadsheet thereby altering the totals.

Many solutions to the general problem of consistency control in the small scale environment of multi-tasking operating systems and smaller networks are known in the art. Consistency control is nevertherless a major problem in large scale networks because of the lack of a centralized storage management system.

SUMMARY OF THE INVENTION

A method in accordance with the invention utilizes a client/server network of information processing devices that includes a centralized database of storage locations; communication among the networked devices is by means of a generalized command set. The centralized database of storage locations maintains a list of information locations and other information associated with a particular piece of information and coordinates access to the data. Devices connected to the network communicate by issuing and receiving generalized commands to access, manage and maintain content.

DETAILED DESCRIPTION OF SPECIFIC EMBODIMENTS

Illustrative Methods

General Example

An illustrative embodiment of a method in accordance with the invention is described below. In the interest of clarity, not all features of actual implementation are necessarily described in this specification. It will, of course, be appreciated that in the development of any such actual implementation, as in any such project, numerous decisions must be made to achieve the specific goals of the network designer which will vary from one implementation to another. It is appreciated that development of a large scale network is complex and time consuming, but would nevertheless be a routine undertaking for those of ordinary skill in the art.

Figure 1A:
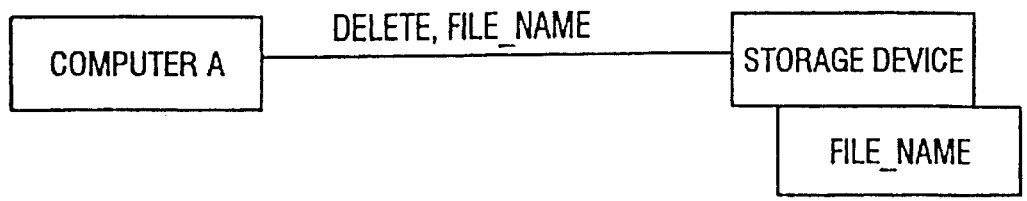
FIGS. 1A, 1B, 2 are block diagrams illustrating the interaction of computing and storage devices with interface commands.
Figure 1B:
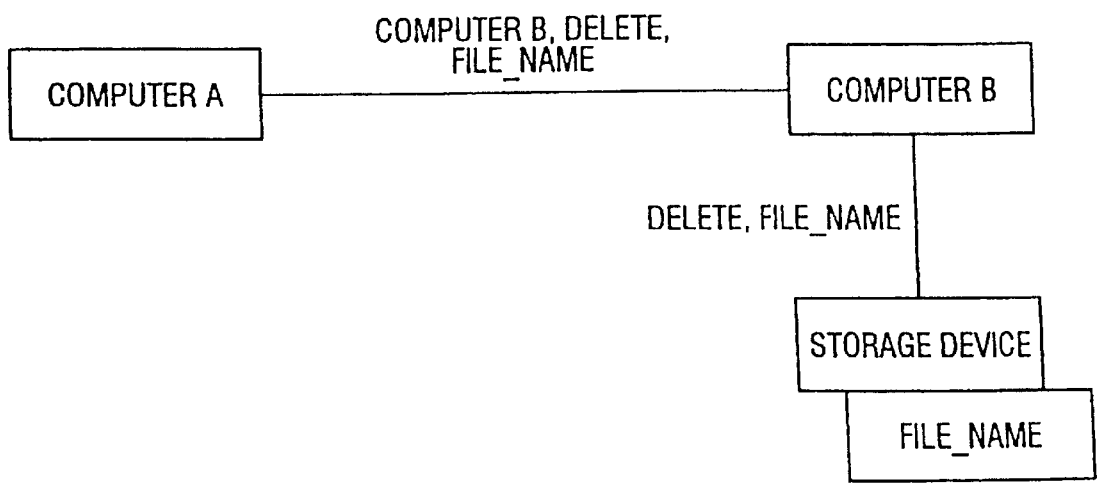
Figure 2:
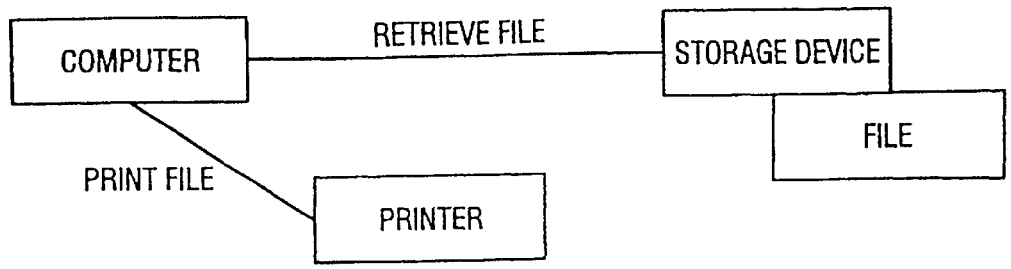
Figure 3:
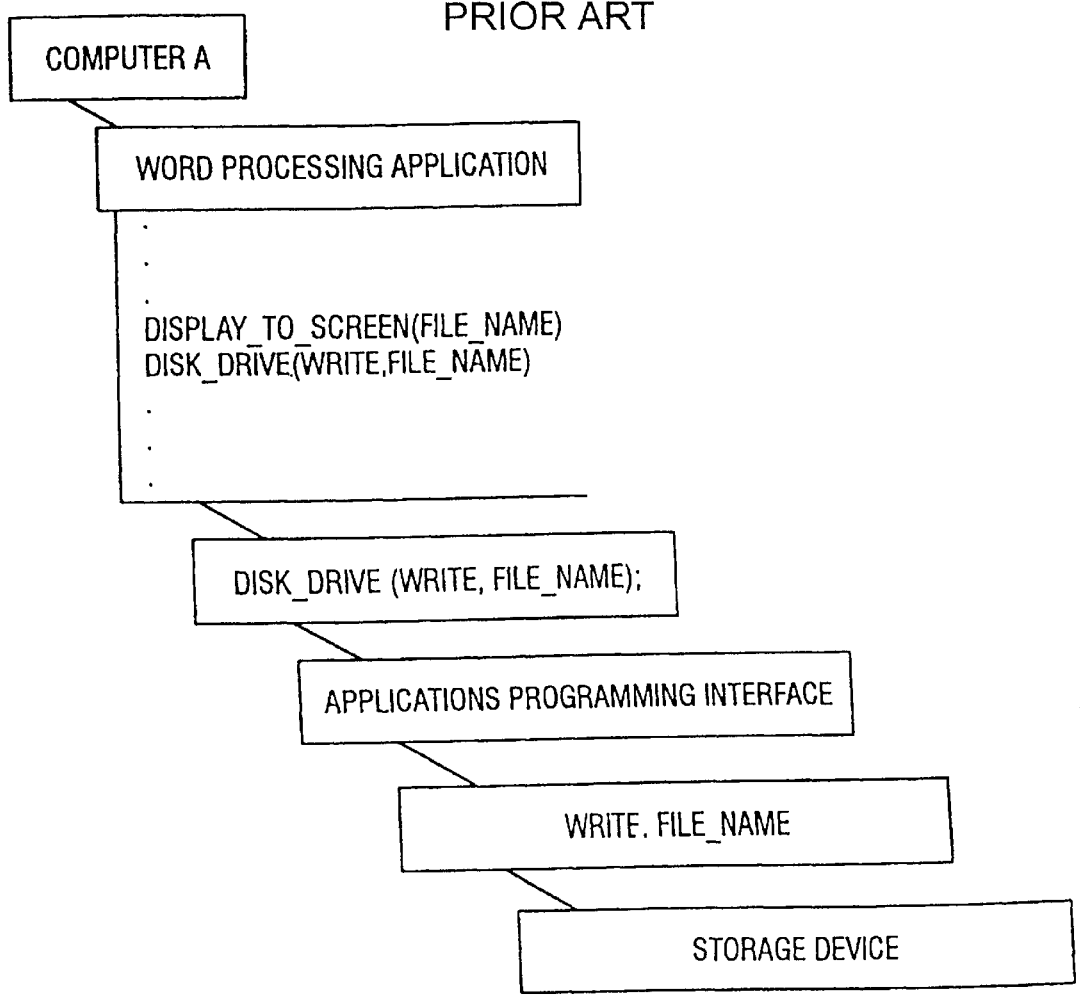
FIG. 3 is a block diagram which illustrates the interrelation of computing and information storage devices, applications, application programming interfaces, and interface command sets.
Figure 4:
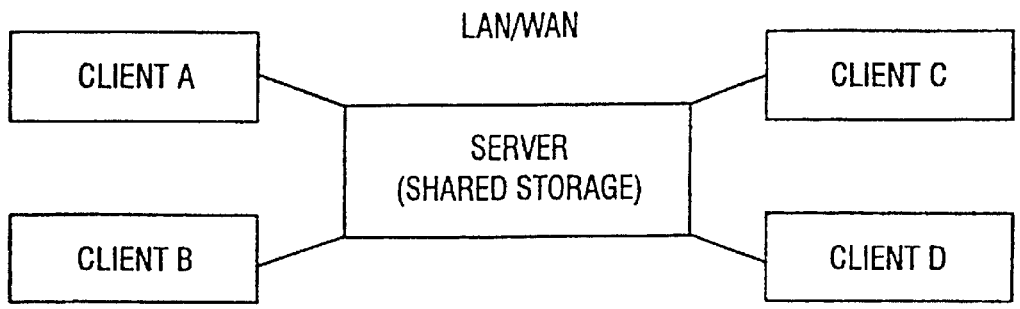
FIGS. 4, 5, 6, 7 and 8 are block diagrams illustrating typical computing/information storage device networks.
Figure 5:
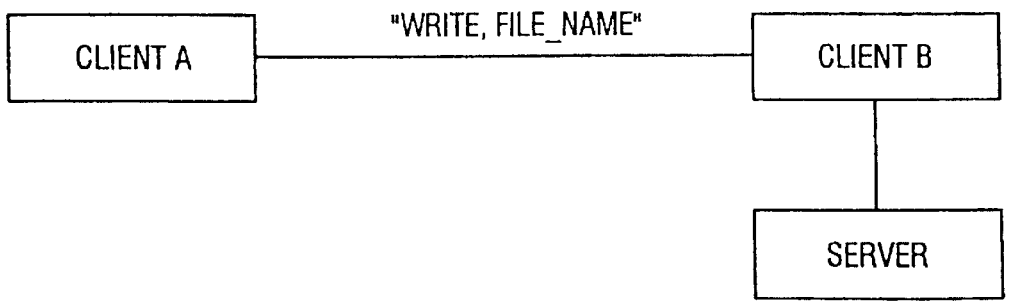
Figure 6:
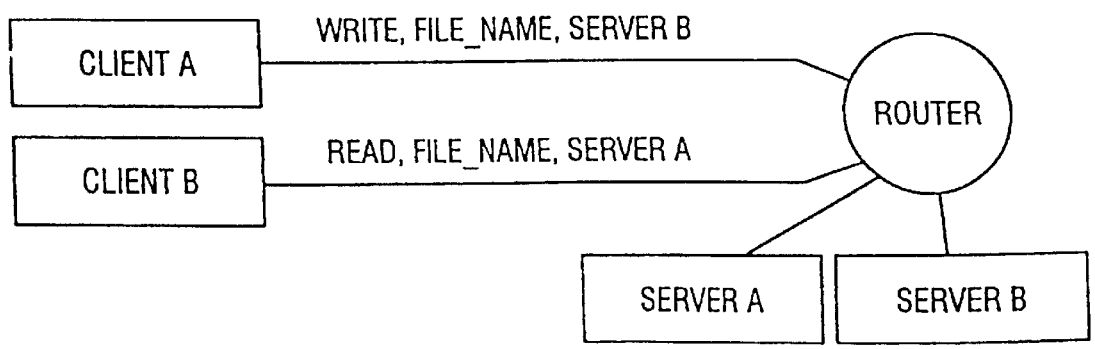
Figure 7:
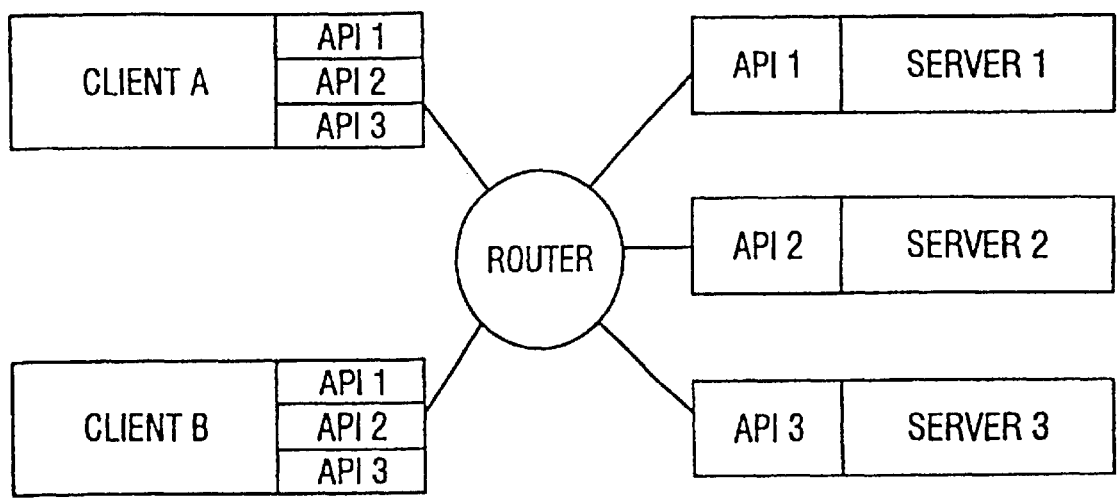
Figure 8:
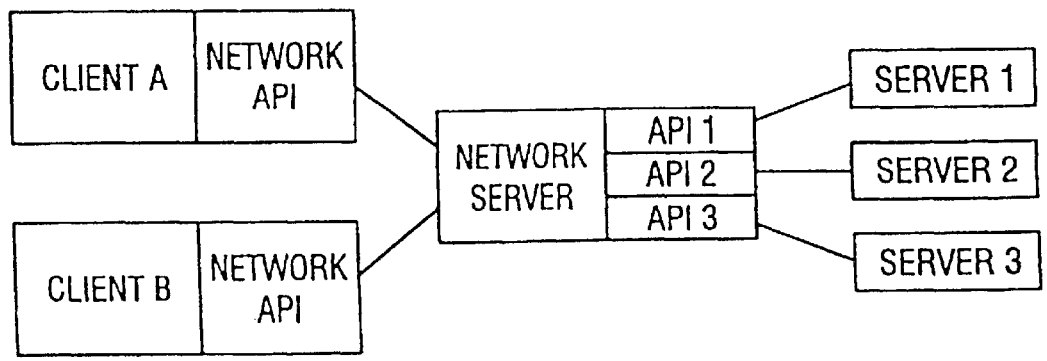
Figure 9:
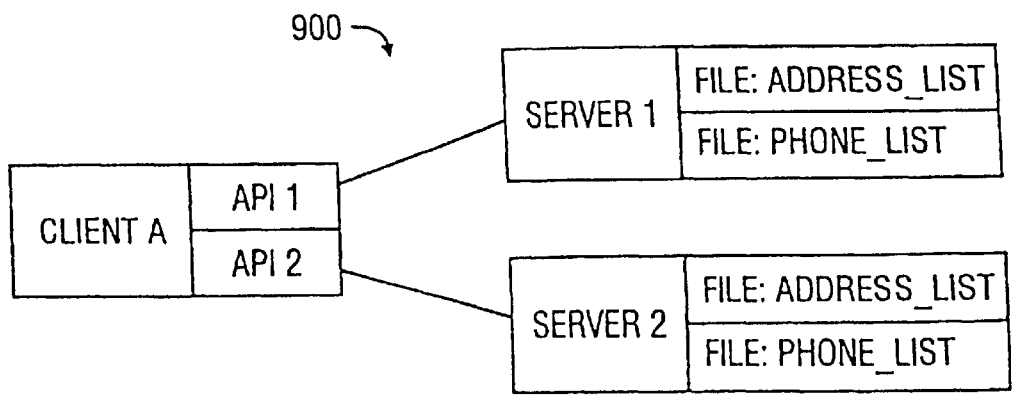
FIGS. 9 and 10 are block diagrams illustrating consistency control problems in prior art networks.
Figure 10:
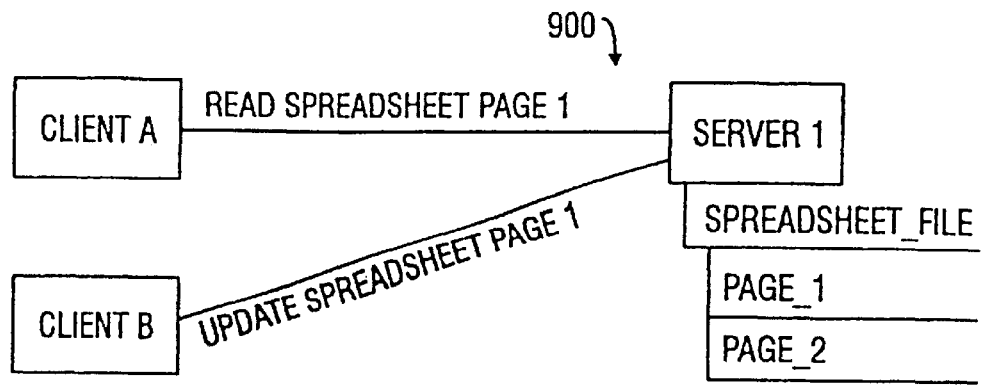
Figure 11:
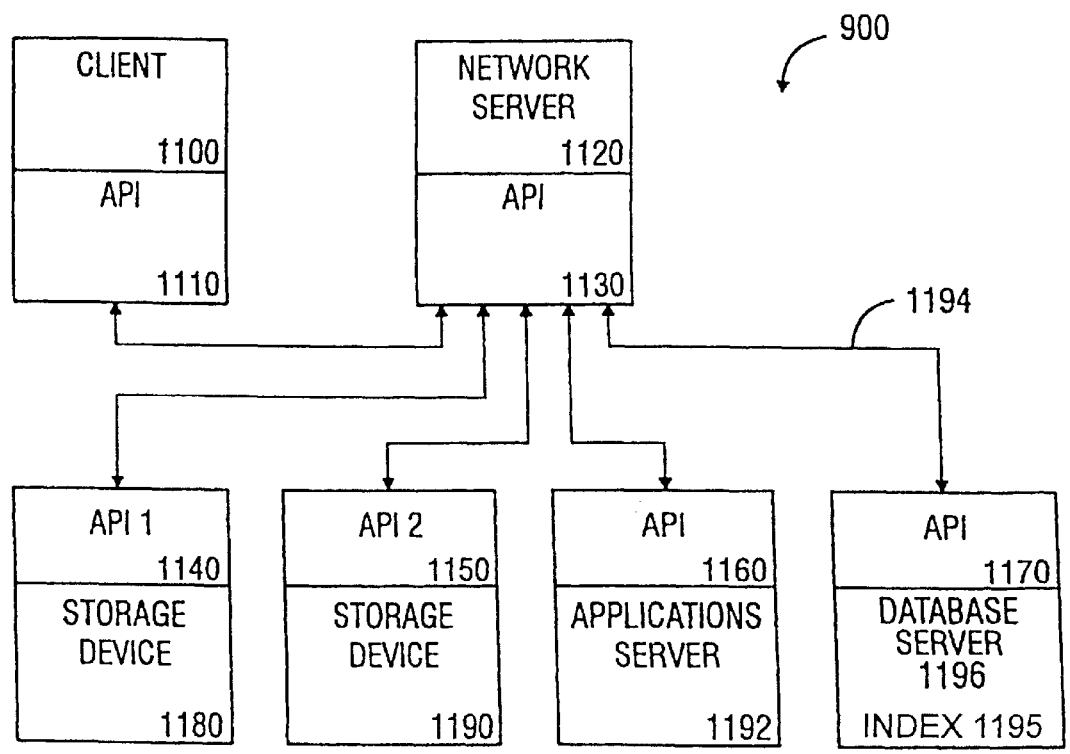
FIGS. 11, 12, and 13 are block diagrams of embodiments of the invention.

Referring to FIG. 11, a simplified diagram of a network 900 in accordance with the present invention is shown.

In the network 900, a client 1100 is typically an end user terminal from which an end user wishes to interact with the network in some manner. Although the client 1100 will normally be a personal computer of some sort (IBM compatible PC, MacIntosh, etc.), it may be any general purpose computing device connected to the network.

The client 1100 executes API-implementing software 1110 (sometimes referred to as simply "API 1110"). The API 1110 handles interactions with other software operating on the client 1100, in particular the processing and passing on of network commands intended to control other devices connected to the network. The API 1110 also handles commands or information intended for the client 1100.

Other APIs perform similar functions for other devices on the network. For example, APIs 1130, 1140, 1150, 1160, and 1170 perform such functions for a network server 1120, a storage device 1180, a storage device 1190, an applications server 1192, and a database server 1196.

The network server 1120 is a general purpose computing device which processes and routes network commands to their intended devices. The storage devices 1180 and 1190 may be, e.g., hard disks or high-capacity video storage servers; they may store any type of information including data, video, sound, applications, multimedia, etc.

The applications server 1192 is a storage device similar to storage devices 1180 and 1190, except that the information stored thereon is usually limited to computer programs (applications) suitable for use by other devices connected to the network. Thus, the applications server 1192 acts as a centralized application storage location; any other device, although typically a client 1100, may request an application from the applications server 1192.

The database server 1196 is a storage device on which a database of "meta-information," i.e., information about the information stored on the storage devices 1180 and 1190 and on the applications server 1192, is maintained.

Of course, those of ordinary skill in the art will appreciate that there may be, and typically are, a large number of both clients and servers connected to the network at any time. Each device is conventionally assigned a unique identifier (an "address").

The database server 1196 maintains a database of identifying information concerning other information stored on the network including name, location, data type, access rights, accesses, orginator, and other information which maybe specific to a particular application or implementation of the invention. Index information can include data consisting of information location, type, source, rating date information stored, and time information stored.

The connection lines 1194 are representative of the many means by which devices may be connected to the network. For example, the connection lines 1194 may be ordinary telephone lines, coaxial cable, optical connections, local wireless, satellite links or any other means of sending or receiving information to or from the network. The network itself may be either local or wide area or a combination of both.

In operation, suppose that the client 1100 requires a listing of information (the "index") stored elsewhere on the network from database server 1196. The client 1100 issues a request for information, which is first passed to the API 1110 where it is translated to a common communication format or command.

The request is then passed to the API 1130 where it may be translated for service by the network server 1120, additional operations may be performed (adding database server address), and/or the request may be passed on. The request is then directed to the API 1170 where it is translated to a format recognizable by the database server 1196.

The database server 1196 may first examine the requested information and the source of the request and determine if the client 1100 is authorized to access the information. The collection of rights to information or operations is referred to as "access rights" and are typically set in any convenient conventional manner by the network administrator on a user-by-user or group basis using the API command set.

If the client 1100 has access rights to the information requested, the database server 1196 will return the requested information to it. Information intended for the client 1100 may be packaged with the address of the client 1100 and then returned to it along the same general path. If the client 1100 does not have access rights to the requested information, an error code may be returned to it instead.

Assuming that the client 1100 was authorized to receive the index from database server 1196, the client 1100 may then request information from the storage device 1180. Because the index returned by the database server 1196 contains identifying information, including an address of the requested information, the client 1100 may issue a request for information located on storage device 1180. This request is handled in the same general manner as the request directed to the database server 1196, except that additional operations are performed in order to maintain the index 1195 stored on the database server 1196.

As before, a request for information from the client 1100 first passes through the network before arriving at database server 1196. There, information is recorded about the request (type of request, client requesting, billing information, etc.) in the database.

Certain operations (deletions, changes, etc.) may require that simultaneous access by other clients be prevented. In those cases, the information is conventionally "locked" and only one client is allowed to access the information during that time. In contrast, multiple clients may perform other operations on the same piece of information at the same time, e.g., multiple clients may read the data simultaneously.

With the request for information recorded by the database server, the database server may issue a network command instructing the appropriate storage device to deliver the requested information to the appropriate client.

Thus, an entire request/delivery cycle may be handled by the network without the need to poll each storage device and without experiencing consistency control problems.

Of course, while the foregoing example illustrates an information request/retrieval cycle, many other types of operations may be processed in the same general manner including additions to the network, deletions, updates, etc.

In addition to performing operations on information content stored on storage devices 1180, 1190, the same general process may be employed to access applications stored on applications server 1192. Thus, client 1100 may request access to an application (e.g., a word processor) stored on applications server 1192. After approval and logging of the request by database server 1196, applications server 1192 will be instructed to deliver the requested application to the appropriate client.

Because communication among the various devices connected to the network 900 is by means of a standardized command/communication format, the need to translate among multiple interface command sets is eliminated as is the need for a multiplicity of APIs.

Figure 12:
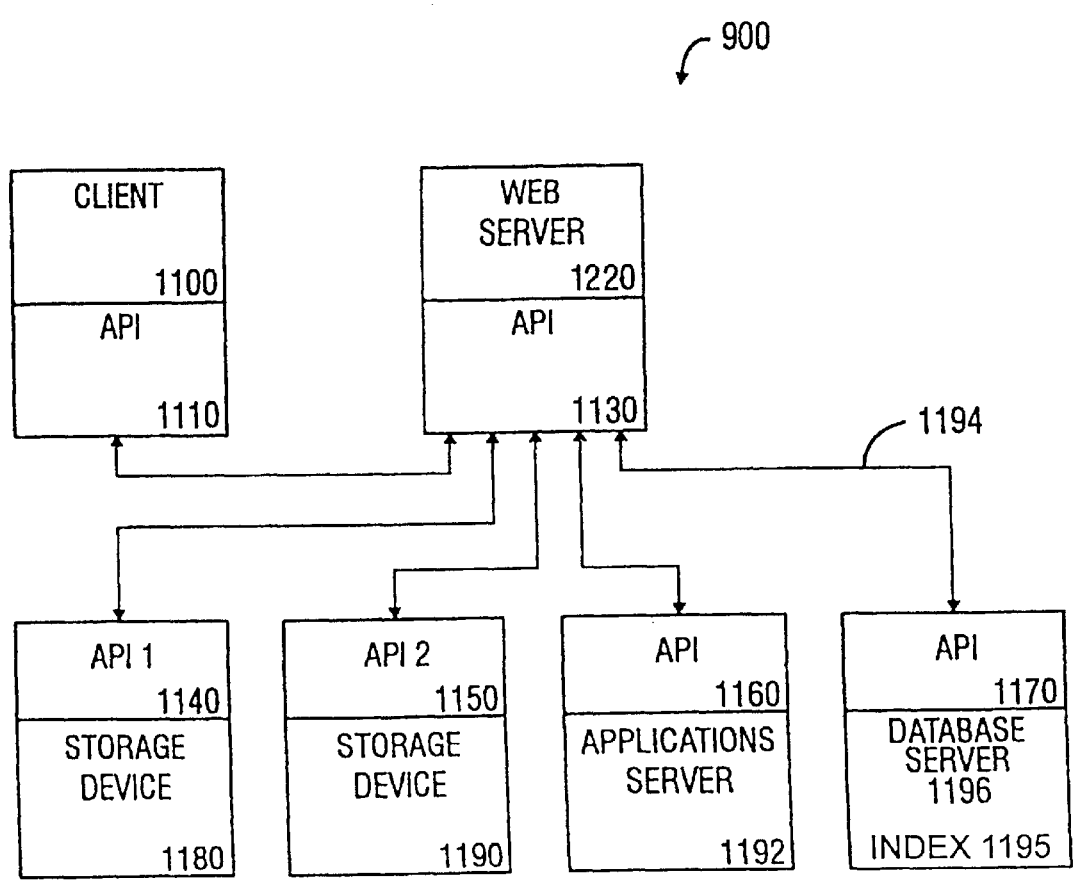

In FIG. 12, the client 1100 interacts with the network through an interface conforming to World Wide Web standards or common communications formats. Those of ordinary skill in the art will, of course, realize that standards such as those employed by the World Wide Web are constantly evolving and changing and different or additional standards may replace those currently used by World Wide Web compliant software (i.e., browsers). In the FIG. 12, requests by the client 1100 first pass through a World Wide Web API 1130 before arriving at web server 1220. The Web server 1220 may be a separate machine or may be other software running on the network server 1120 of FIG. 11. Returning to FIG. 12, the web server 1220 processes the request before sending it on to the API 1130 where a network command is issued.

Multi-Media Example

Figure 13:
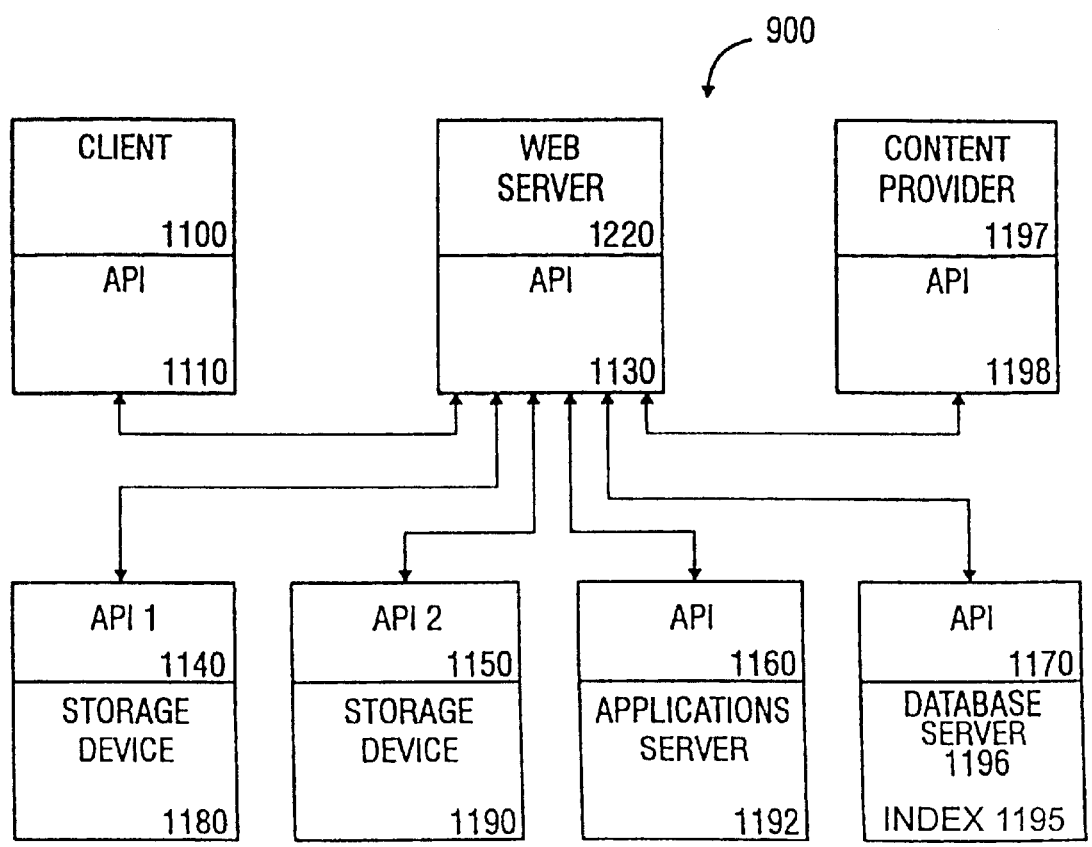

Referring to FIG. 13, a simplified diagram of a network 900 intended to deliver and manage multi-media content and in accordance with the present invention is disclosed.

Operating in the same general fashion as described in FIGS. 11 and 12, a client 1100 in FIG. 13 issues a request for the index 1195 of information stored on the network 900, and particularly movies, from a database server 1196. The database server 1196 returns a listing of movies stored on the network 900 to the client 1100. The client 1100 then selects a particular movie from the returned index 1195. After logging (billing, rating approval, etc.) and approval of the request by the database server 1196, the storage device on which the movie is stored (storage device 1180) is directed to deliver the movie to the client 1100.

In the FIG. 13, the content provider 1197 may be a computer of the same type as the client 1100 or any other information processing device and the API 1198 performs the same general function as API 1110. The content provider 1197 may be any entity wishing to place content, such as movies or other multi-media information, on the network 900. Storage space, on storage devices 1180, 1190, for content provided by the content provider 1197 may first be reserved by logging the space requirements and other information about the content in the index 1195 maintained on database server 1196. The content may then be stored on the appropriate storage device (1180, 1190) and the index 1195 on database server 1196 updated. Thus, the content will appear in future requests by the client 1100 for the index 1195 stored on the database server 1196.

Some attempt has been made throughout this disclosure to refer to devices whose primary operation is storage as "storage devices" and devices whose primary operation is servicing requests as "servers." Of course, those of ordinary skill in the art will appreciate that these labels are arbitrary and are merely intended to indicate the primary function of each device in this description. In the art, storage devices are often referred to as servers as are general purpose computing devices which handle requests across a network.

Embodiment Specification Appendix

Accompanying this application as Appendix A is a detailed specification for a specific embodiment of the invention in the form of the VYVX Video Archiver Model and API Functional Specification as implemented by the Williams Co. of Tulsa, Okla. This material is copyrighted and is the property the Williams Co. Authorization is granted to make copies of this material in conjunction with making facsimiles of this application and any patent(s) issuing thereon, but all other rights are reserved. The implementation is primarily related to a large scale network for delivering and processing multimedia information. As will be appreciated from the above disclosure, networks practicing the claimed invention have a broad range of potential applications. As implemented the VYVX network is suitable for use in on-demand video services applications. Practicing the invention, the VYVX network is able to manipulate large volumes of multimedia information (movies, sounds, data, etc.) and provide that information to clients located worldwide in a real-time, on-demand manner. Thus, a client located in one region of the United States (or anywhere else in the world) may wish to view a movie and the VYVX network is capable of locating the movie anywhere on the network and delivering the movie to the client.

Program Storage Device

Any of the foregoing variations may be implemented by programming a suitable general purpose microprocessor and other related devices that are part of the network. The programming may be accomplished through the use of a program storage device readable by the machine and encoding a program of instructions executable by the machine for performing the operations described above. The program storage device may take the form, e.g., of one or more floppy disks; a CD-ROM or other optical disk; a magnetic tape; a read-only memory chip (ROM); and other forms of the kind well-known in the art or subsequently developed. The program of instructions may be "object code," i.e., in binary form that is executable more-or-less directly by the computer, in "source code" that requires compilation or interpretation before execution; or in some intermediate form such as partially compiled source code. The precise form of the program storage device is immaterial here.

In the following claims, lettering is used to identify subparagraphs solely for convenient reference and not necessarily to indicate the order in which method operations are performed unless expressly indicated otherwise. For example, unless otherwise clear from the context, labeling of two operations in a claim as subparagraphs (b) and (c) is not intended to limit the claim to performance of those operations in that particular order.

It will be appreciated by those of ordinary skill having the benefit of this disclosure that the illustrative embodiments described above are capable of numerous variations without departing from the scope and spirit of the invention. Accordingly, the exclusive rights sought to be patented are as described in the claims below.

What is claimed is:

1. A method of manipulating an item of information content in a network comprising an interconnection of computing and storage devices, the method comprising operations wherein:
   (a) a client machine transmits to a server a signal requesting performance of a manipulation operation on an item of content, referred to as a request signal;
   (b) the server having an index not stored on the client machine of data relating to the content receives the request signal and transmits a reply signal that includes the index to a server machine; and
   (c) the server machine transmits one or more signals based on the data in the index to one or more of a database server, an application server, and a storage device to cause the manipulation operation to be performed on the requested item of content from the client machine, whereby the manipulation operation occurs without polling the one or more database server, application server, and storage device to locate the item of content.

2. The method of claim 1, wherein the content includes video content.

3. The method of claim 1, wherein the manipulation operation comprises moving the item of content from one location in the network to another location in the network.

4. The method of claim 1, wherein the client machine interacts with a user through a Web-browser interface.

5. The method of claim 4, wherein the client machine (1) executes a Web browser program, (2) downloads a Java applet from the server machine, and (3) executes the Java applet to transmit the request signal.

6. The method of claim 1, wherein the data of the index includes at least one datum selected from the group consisting of:
   (1) information location;
   (2) information type;
   (3) information size;
   (4) information source;
   (5) information rating;
   (6) date information stored; and
   (7) time information stored.

7. The method of claim 1, wherein the server machine can be selected from a group consisting of a network server, a web server, an application server and a database server.

8. The method of claim 1, wherein the server having the index of data can be selected from a group consisting of a network server, a web server, an application server, a database server and a storage device.

9. The method of claim 1, wherein the server having the index of data can reside in the server machine.

10. Apparatus for storing and retrieving content, comprising:
    (a) a network;
    (b) at least one client machine connected to the network;
    (c) at least one server machine connected to the network;
    (d) at least one storage device connected to the network that contains content;
    (e) at least one database machine connected to the network that contains an index not stored on any client machine of data related to information about the content;
    (f) the client machine, server machine, storage device, and database machines communicating over the network by transmitting signals in accordance with a common communication format; and
    (g) the common communication format including commands by which the client machine can transmit to the at least one server machine a request to perform a manipulation of content, whereby the manipulation operation occurs without polling the at least one storage device to locate the item of content.

11. The apparatus of claim 10, wherein the manipulation of content comprises at least one operation selected from the group consisting of:
    (a) displaying an item of content on the client machine;
    (b) copying an item of content from one storage device to another storage device;
    (c) deleting an item of content from a storage device;
    (d) adding an item of content to a storage device;
    (e) editing information contained in the database about an item of content;
    (f) editing the item of content.

12. The method of claim 10, wherein the data of the index includes at least one datum selected from the group consisting of:
    (1) information location;
    (2) information type;
    (3) information size;
    (4) information source;
    (5) information rating;
    (6) date information stored; and
    (7) time information stored.

13. A system for managing multimedia content across a network; said system comprising:
    (a) a network;
    (b) at least one controller computer coupled to or previously coupled to said network;
    (c) at least two storage devices coupled to or previously coupled to said network, said storage devices storing multimedia content;
    (d) at least one index not stored on any controller computer of data related to the multimedia stored on said storage devices coupled to or previously coupled to said network, wherein said index includes information about said multimedia content stored on said storage devices, said index information including at least one datum selected from the group consisting of:
(1) information location;
(2) information type;
(3) information size;
(4) information source;
(5) information rating;
(6) date information stored; and
(7) time information stored;

(e) wherein the system manages the multimedia content across the network by transmitting a request for performance of a manipulation operation based on the at least one index of data and the manipulation operation occurs without polling said storage devices to locate the multimedia content.

14. The system of claim 13, wherein said controlling computer, said storage devices and said index communicate according to an application programming interface.

15. A method of operating a computer network comprising:
(a) a client issuing a request for information;
(b) a server passing the information request from said client to a database machine;
(c) said database machine having at least one index not stored on the client of data relating to the information, said database machine retrieving identifying information based on the index, including location of said requested information and issuing a request for a storage device connected to said network on which said requested information is stored to send said requested information to said requesting client, whereby said requested information is retrieved without polling at least one storage device to locate said information.

16. The method of claim 15, wherein said requested information requests are in the form of an application programming interface.

17. The method of claim 15, wherein said requested information is multimedia information.

18. The method of claim 15, wherein the data of the index includes at least one datum selected from the group consisting of:
(1) information location;
(2) information type;
(3) information size;
(4) information source;
(5) information rating,
(6) date information stored; and
(7) time information stored.

19. A method executed by a server providing multimedia information comprising:
(a) receiving a request from a client for information;
(b) maintaining a database of said requests;
(c) locating said requested information in an index not stored on the client of data related to the information; and
(d) issuing a request based on the index data for a storage device connected to said network on which said requested information is stored to send said requested information to said requesting client, whereby said requested information is retrieved without polling at least one storage device to locate said information.

20. The method of claim 19, wherein said information requests are formatted in a predefined standard.

21. The method of claim 19, wherein said requested information is multimedia information.

22. The method of claim 19, wherein the data of the index includes at least one datum selected from the group consisting of:
(1) information location;
(2) information type;
(3) information size;
(4) information source;
(5) information rating;
(6) date information stored; and
(7) time information stored.

* * * * *

UNITED STATES PATENT AND TRADEMARK OFFICE
CERTIFICATE OF CORRECTION

PATENT NO.    : 6,415,289 B1
DATED         : July 2, 2002
INVENTOR(S)   : Mike E. Williams et al.

It is certified that error appears in the above-identified patent and that said Letters Patent is hereby corrected as shown below:

<u>Column 12,</u>
Line 25, Claim 20 should read:

-- 20. The method of claim 19, wherein said information requests are formatted in an application programming interface. --

Signed and Sealed this

Twelfth Day of November, 2002

*Attest:*

*Attesting Officer*

JAMES E. ROGAN
*Director of the United States Patent and Trademark Office*